No. 854,671. PATENTED MAY 21, 1907.
D. S. SEYMOUR.
POWER TRANSMITTING DEVICE.
APPLICATION FILED NOV. 12, 1906.

2 SHEETS—SHEET 1.

Witnesses
Mary W. Hammer
Albert Popkins

Inventor
Dudley S. Seymour
By Sturtevant and Mason
Attorneys

No. 854,671. PATENTED MAY 21, 1907.
D. S. SEYMOUR.
POWER TRANSMITTING DEVICE.
APPLICATION FILED NOV. 12, 1906.

2 SHEETS—SHEET 2.

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

POWER-TRANSMITTING DEVICE.

No. 854,671.   Specification of Letters Patent.   Patented May 21, 1907.

Application filed November 12, 1906. Serial No. 343,059.

*To all whom it may concern:*

Be it known that I, DUDLEY S. SEYMOUR, a citizen of the United States, residing at Oak Park, in the county of Cook, State of Illinois, have invented certain new and useful Improvements in Power-Transmitting Devices, of which the following is a description, reference being had to the accompanying drawings, and to the letters and figures of reference marked thereon.

My invention relates to new and useful improvements in power transmitting devices, and while said power transmitting device may be used for various purposes, the same is more especially adapted for use in connection with sewing machines where power is transmitted from a power shaft through the transmitter to the stitching mechanism.

The principal object of my invention is to provide a means for supporting said power transmitter, whereby the same may be adjusted relative to the parts from which power is received and to which power is delivered.

The invention consists in the novel construction and arrangement of parts hereinafter shown and particularly pointed out in the appended claims.

One embodiment of my invention is illustrated in the accompanying drawings, in which:—

Figure 1:
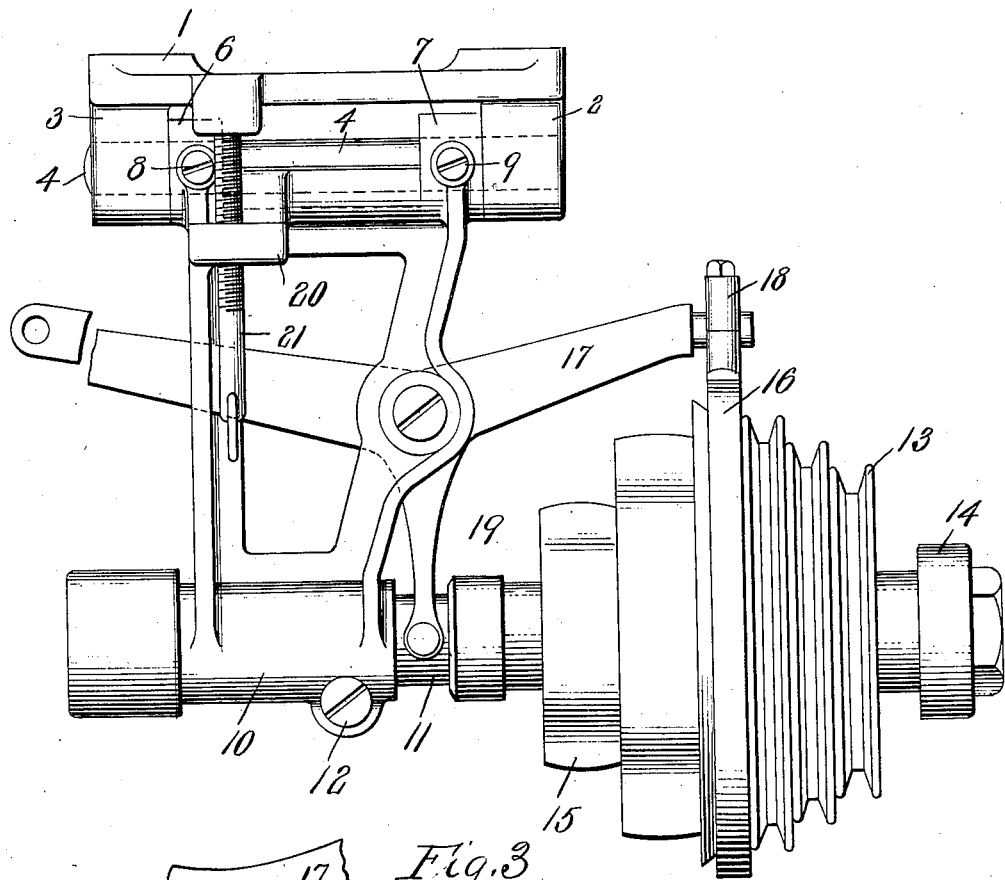
Figure 3:
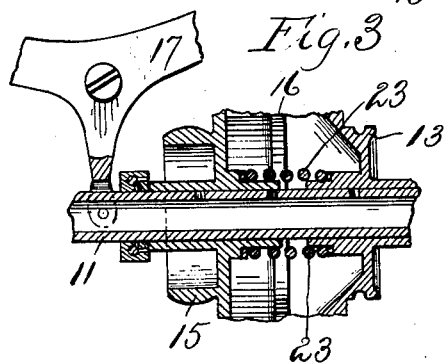
Figure 2:
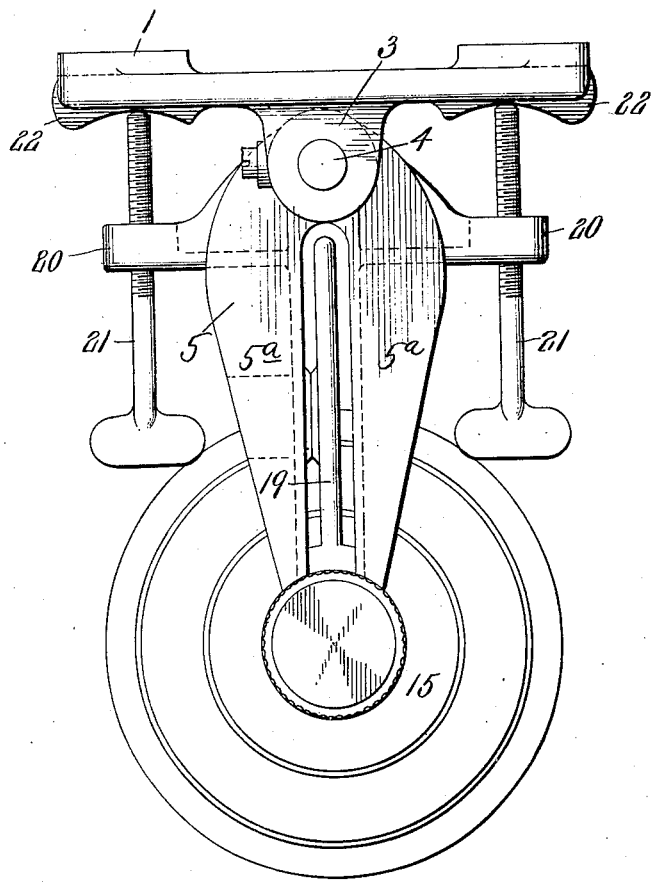

Figure 1 is a side elevation of my improved supporting device for a power transmitter. Fig. 2 is an end elevation of the same. Fig. 3 is a sectional view showing the spring for holding the parts separated.

The power transmitter is mounted on a supporting frame 1 which may be held by any convenient means such as screws or bolts to the under side of the bench or table upon which the machine to be operated is placed. Said frame has depending from its opposite ends bearings 2, 3 through which loosely passes a shaft 4. Secured to the shaft 4 is a bracket 5. In the present embodiment of my invention, I have shown said bracket as having ears 6 and 7 spaced so as to fit between the bearings 2 and 3 and said ears are secured to the shaft 4 by means of screws 8 and 9. The lower end of my bracket 5 is provided with a split bearing 10, which surrounds the supporting shaft 11 of my transmitter, said split bearing being secured to the shaft 11 by a screw 12. Loosely mounted upon the shaft 11 is a belt wheel 13, said belt wheel being held on the shaft by the thrust bearing 14. The pulleys 15 are also loosely mounted on the shaft 11, and are held out of contact with the belt wheel 13 by the usual spring, 23, which is mounted upon projecting flanges extending from the pulley 15 and belt wheel 13 in the usual manner as shown in Fig. 3. The belt wheel 13 is provided with the usual brake disk 16. A lever 17 is pivoted on the bracket 5, and carries a brake shoe 18 of the ordinary construction, co-operating with the brake disk 16. The lever 17 is also provided with an arm 19, which operates to shift the pulleys into clutching engagement with the belt wheel 13.

The bracket 5 is provided with oppositely extending arms 20, each of which is screw-threaded for the reception of a screw 21. The supporting frame 1 is provided with bearing lugs 22, 22, with which said screws 21 co-operate. The bracket 5 has outwardly extending flanges 5$^a$, which serve to strengthen the bracket, and said flange is slotted to form a passage for the lever 17. This arrangement of parts brings the stress caused by operating the lever directly underneath the support for the bracket.

When it is desired to adjust the position of my power transmitter relative to the power shaft from which power is received or the mechanism to which power is delivered, one of said screws 21 is withdrawn from its supporting arm and the other screw is turned so as to swing the entire supporting bracket for the transmitter about the shaft 4 as an axis, until the first named screw is again drawn into contact with its co-operating lug 22.

It will be apparent that by turning the screws 21 one way or the other, the bracket may be swung either to the right or to the left, as viewed in Fig. 2, and that said bracket may be clamped securely in its adjusted position by the means for adjusting the same.

By mounting the lever 17 on the bracket, it will be noted that all adjustments of the bracket carry with it the lever and its co-operating parts, so that the said parts remain in proper relation to each other regardless of the position of the bracket, and I have, therefore, provided a means whereby the same relative position of the pulley, belt wheel, shaft, the pulley-shifting means and the brake means, is maintained for all adjustments of the bracket.

It will be obvious that instead of adjusting the bracket angularly the same may be adjusted in any other manner, without departing from the spirit of my invention, so long as the adjustment is substantially at right angles to the axes of the pulley and belt wheel.

Having thus particularly described my invention, what I claim as new and desire to secure by Letters Patent is:—

1. A power transmitter including in combination a belt wheel, a pulley for transmitting motion to said belt wheel and means for supporting said pulley and belt wheel, comprising a bracket, a support therefor, and means for angularly adjusting said bracket relative to said support; substantially as described.

2. A power transmitter including in combination a belt wheel, a pulley for transmitting motion to said belt wheel and means for supporting said pulley and belt wheel, comprising a bracket, oppositely disposed arms carried by said bracket, a support for said bracket and means carried by one of said arms for adjusting said bracket relative to said support; substantially as described.

3. A power transmitter including in combination a belt wheel, a pulley for transmitting motion to said belt wheel and means for supporting said pulley and belt wheel comprising a bracket, oppositely disposed arms carried by said bracket, a support for said bracket, and threaded screws carried by said arms and engaging said support; substantially as described.

4. A power transmitter including in combination a belt wheel, a pulley for transmitting motion to said belt wheel, and means for supporting said pulley and belt wheel comprising a bracket, having ears thereon a shaft secured to said ears, a support, bearings carried by said support, and receiving said shaft, and means for angularly adjusting said bracket relative to said support; substantially as described.

5. A power transmitter including in combination a belt wheel, a pulley for transmitting motion to said belt wheel, and means for supporting said pulley and belt wheel comprising a bracket, having ears thereon a shaft secured to said ears, a support, bearings carried by said support, and receiving said shaft, oppositely extending arms carried by said bracket, and means carried by said arms for angularly adjusting said bracket relative to said support; substantially as described.

6. A power transmitter including in combination a belt wheel, a pulley for transmitting motion to said belt wheel, and means for supporting said pulley and belt wheel comprising a bracket, having ears thereon a shaft secured to said ears, a support, bearings carried by said support, and receiving said shaft, oppositely extending arms carried by said bracket and threaded screws passing through said arms and engaging said support; substantially as described.

7. A power transmitter including in combination a belt wheel, a driven pulley, and means for supporting said belt wheel and driven pulley including a bracket, a support having spaced bearings, there being perforated ears carried by said bracket, and located between said bearings on said support, a shaft passing through said bearings and said ears, set screws for securing said shaft to said bracket, and means for angularly adjusting said bracket relative to said support; substantially as described.

8. A power transmitter including in combination a belt wheel, a driven pulley, and means for supporting said belt wheel and driven pulley including a bracket, a support having spaced bearings, there being perforated ears carried by said bracket and located between said bearings on said support, a shaft passing through said bearings and said ears, set screws for securing said shaft to said bracket, oppositely extending arms carried by said bracket and means carried by said arms for angularly adjusting said bracket relative to said support; substantially as described.

9. A power transmitter including in combination a belt wheel, a driven pulley, and means for supporting said belt wheel and driven pulley including a bracket, a support having spaced bearings, there being perforated ears carried by said bracket and located between said bearings on said support, a shaft passing through said bearings and said ears, set screws for securing said shaft to said bracket, oppositely extending arms carried by said bracket and screws coöperating with said arms for angularly adjusting said bracket relative to said support; substantially as described.

10. A power transmitter including in combination a belt wheel, a pulley for transmitting motion to said belt wheel and means for supporting said pulley and belt wheel, comprising a bracket, a support therefor, and means for angularly adjusting said bracket relative to said support and for holding the same in its adjusted positions; substantially as described.

11. A power transmitter, including in combination, a belt wheel, a pulley for transmitting motion to the said belt wheel, and means for supporting said pulley and belt wheel, comprising a bracket, a support therefor, and means for adjusting said bracket at right angles to the axes of said pulley and belt wheel; substantially as described.

12. A power transmitter, including in combination, a belt wheel, a pulley for transmitting motion to the said belt wheel, and means for supporting said pulley and belt wheel, comprising a bracket, a support for said bracket, and means carried by said bracket for adjusting it upon its support; substantially as described.

13. A power transmitter, including in combination, a belt wheel, a pulley for transmitting motion to the said belt wheel, and means for supporting said pulley and belt wheel, comprising a bracket, a support for said bracket, and means carried by said bracket for swinging the same upon its support; substantially as described.

14. In a power transmitting device, a shaft, a pulley and a belt wheel mounted on said shaft, means to force said pulley and belt wheel into engagement one with the other, means for supporting said shaft, pulley, belt wheel, and pulley engaging means whereby the relative position between the same is maintained, means for adjusting said supporting means at right angles to said shaft, and for maintaining said supporting means in its adjusted position; substantially as described.

15. In a power transmitting device, a shaft, a pulley and belt wheel mounted on said shaft, means to force said pulley and belt wheel into engagement one with the other, means to disengage said pulley and belt wheel, means for supporting said shaft, pulley, belt wheel, the engaging means and disengaging means whereby the same relative position of said parts is maintained, means for adjusting said supporting means at right angles to said shaft, and for maintaining said supporting means in its adjusted position; substantially as described.

16. In a power transmitting device, a shaft, a pulley and belt wheel mounted on said shaft, means to force said pulley and belt wheel into engagement one with the other, means to disengage said pulley and belt wheel, means acting upon the belt wheel to arrest its movement, means for supporting said shaft pulley, belt wheel, said engaging means, said disengaging means and said belt wheel arresting means, and means for adjusting said supporting means at right angles to said shaft, and for maintaining said supporting means in its adjusted position; substantially as described.

17. A power transmitter including in combination a belt wheel, a pulley for transmitting motion to said belt wheel means for supporting said pulley and belt wheel comprising a bracket, a support therefor, means to force said pulley and belt wheel into engagement one with the other mounted upon said bracket and means to adjust said bracket at right angles to the axis of the said pulley and belt wheel; substantially as described.

18. In a power transmitting device, a pulley and belt wheel, a frame upon which said pulley and belt wheel are supported, a support for said frame, a lever to force said pulley and belt wheel into engagement with each other mounted upon the support for said pulley and belt wheel, whereby said lever is retained in operative relation to said belt wheel and pulley in the various adjusted positions of said belt wheel and pulley and means for adjusting said belt wheel and pulley at right angles to their axes; substantially as described.

19. In a power transmitting device, a shaft, a supporting bracket, a pulley and belt wheel mounted on said shaft, and a lever for forcing said belt wheel and pulley into engagement, said supporting frame being provided with a slotted flange through which said lever passes, whereby the stress caused by said lever is central of said bracket; substantially as described.

In testimony whereof I affix my signature, in presence of two witnesses.

DUDLEY S. SEYMOUR.

Witnesses:
CHESTER McNEIL,
A. B. CLOTHIER.